United States Patent Office 3,463,627
Patented Aug. 26, 1969

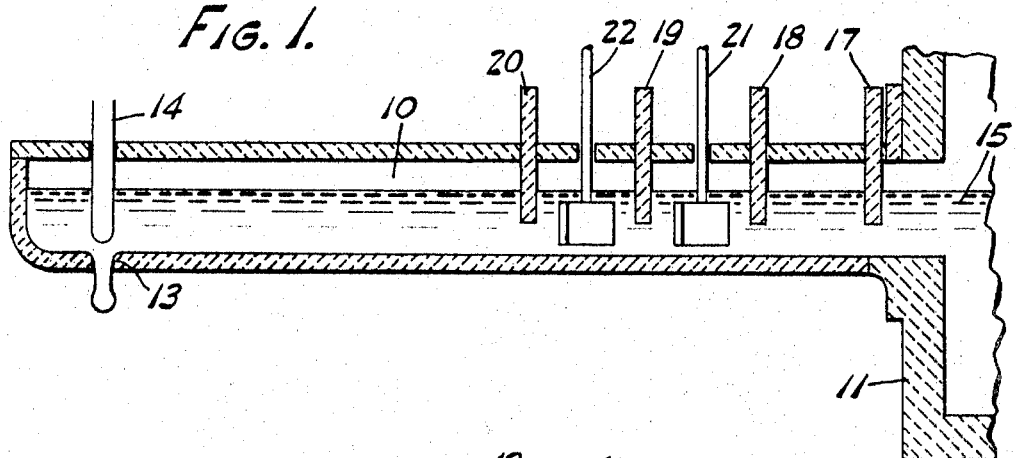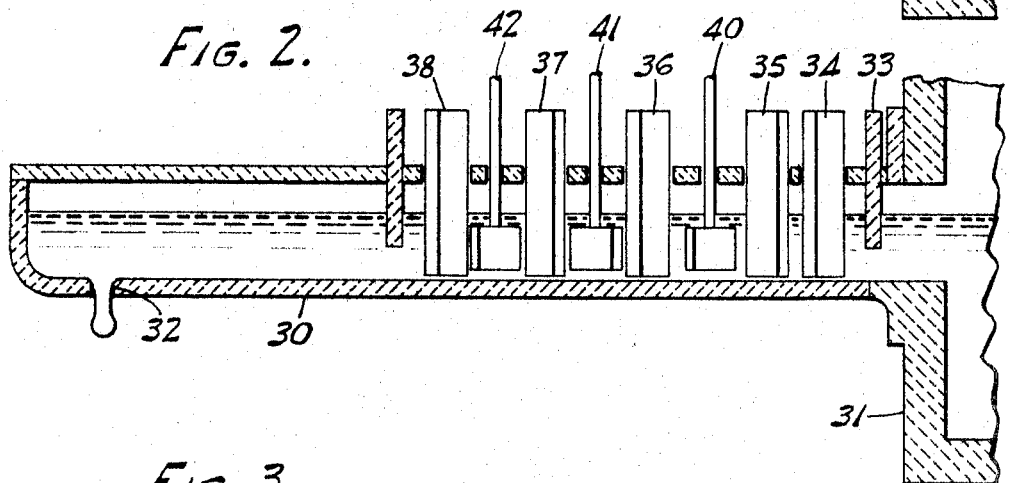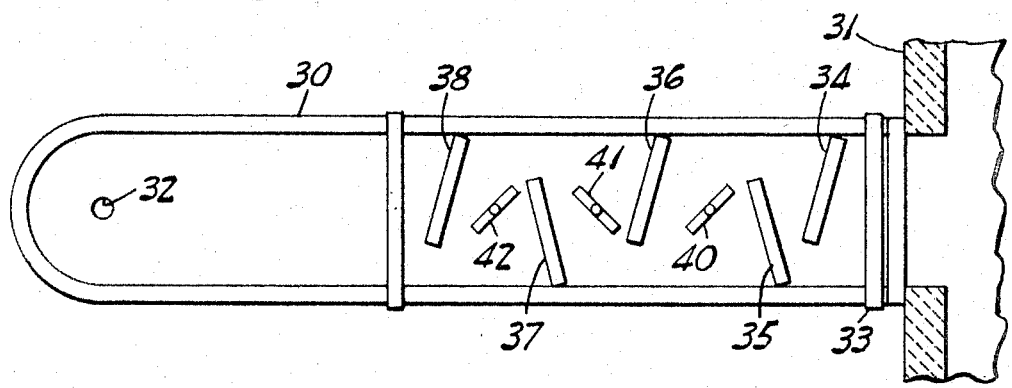

3,463,627
METHOD FOR PRODUCING COLORED GLASS
John R. LeBlanc, Brockway, Pa., assignor to Brockway Glass Company, Inc., Brockway, Pa.
Filed June 16, 1966, Ser. No. 558,023
Int. Cl. C03b 5/16; C03c 1/10
U.S. Cl. 65—134                              1 Claim

ABSTRACT OF THE DISCLOSURE

A process for coloring glass whereby there is a glass melting furnace having a forehearth at the discharge end of the melting tank for receiving molten fined clear glass with chromic oxide refractory elements interposed in the forehearth to be impinged against by the clear molten glass, whereby the glass takes up chromic oxide by erosion from the interposed elements in a quantity sufficient to impart a green color to the glass.

---

This invention relates to coloring molten glass in the forehearth of a continuous tank-type glass melting furnace wherein clear or flint glass is being produced, such coloring being effected by passing the molten glass in contact with chromic oxide refractory material for producing green glass by erosion of the refractory material into the molten glass, the refractory material comprising baffle walls or movable impellers or stirrers or both in combination.

In the melting of glass in continuous tank furnaces for manufacturing glass containers or the like it is customary to run clear glass or glass of a given color in a given furnace. Changing color by changing batch ingredients during a run is not practical because a useless mixture of old and new color will continue over a long period of time with large waste of glass and time. To change colors is impractical without completely emptying and shutting down the furnace.

In order to overcome this problem and make it possible to produce colored glass for temporary periods from a continuous furnace which normally produces flint glass, various proposals have been made to add colored frit or colored molten glass to the molten glass in the furnace, including proposals to add such frit or molten glass to the forehearth after the main body of glass has been melted and fined.

As to adding colored frit to the glass in a forehearth, the amount of cold frit which can be added without producing seed in the glass is very much limited. Also, with frit containing higher concentrations of $Cr_2O_3$ there is a very strong likelihood of precipitating $Cr_2O_3$ in the form of black specks in the glass. A further objection to coloring glass by adding frit in the forehearth is economic. For example, to run a 0.20% $Cr_2O_3$ emerald green glass using a frit with a 2.0% $Cr_2O_3$ content, which approaches conventional limits of chrome frits, it would require 10% of the total glass pull to be supplied as frit.

If molten colored glass is to be added to flint glass in a forehearth it is necessary to add glass having a very high color concentration in order to produce a desired color in the main body of glass passing to the forehearth from the melting tank of the furnace. Even so, large volumes of colored glass would be required. For instance, to produce a given color concentration in the final glass, even if the concentration of colorants in the molten glass to be added in the forehearth is ten times the desired ultimate concentration, it would require that the molten colored glass added in the forehearth be one ninth of the amount of clear glass supplied to the forehearth from the main melting tank of the furnace.

In any event, the forehearth coloring method of the present invention may be employed by itself or as a supplement to the addition of colored frits or colored molten glass in the forehearth.

Speaking generally, the present invention involves the addition of colorants in the forehearth of a conventional continuous tank type glass furnace after flint glass has been melted and fined in the main tank portion of the furnace and has passed to the forehearth for cooling to working temperature and delivery to the gob feeding orifice of the forehearth. This addition is accomplished by disposing various combinations of chromic oxide refractory parts, in the form of skimmers, baffle walls and stirrers, so that the glass flowing through the forehearth comes into erosive contact against the chromic oxide refractory and takes up chromic oxide colorant therefrom by erosion.

Chromic oxide refractories are readily available which contain approximately 96% of $Cr_2O_3$ so that this well-known glass coloring constituent can be readily and practically added to the glass by refractory erosion without any substantial contamination of the glass with other constituents of the refractory. In addition to the use of chromic oxide refractories in the parts mentioned above, wall sections of chromic oxide refractory may be inserted in the forehearth for the same purpose.

It is desired that the parts comprising the chromic oxide refractories be such as to be removable and replaceable selectively so that the output of a given glass furnace which ordinarily produces flint glass may be either flint glass or a selected shade of green glass.

The drawings herein depict preferred apparatus for practicing the present invention but it is to be understood that these embodiments are set forth to illustrate the principles of the invention, the spirit and scope of which is not limited excepting as defined in the appended claims.

In the drawings:

FIG. 1 is a longitudinal vertical cross-sectional view of the forehearth of a tank type glass melting furnace showing the adjacent refiner portion of the furnace proper at the entry end of the forehearth and showing one form of apparatus for practicing the present invention;

FIG. 2 is a view similar to FIG. 1 but showing another form of apparatus for practicing the present invention; and FIG. 3 is a horizontal cross-section through the forehearth of FIG. 2.

Referring first to the embodiment shown in FIG. 1, a forehearth 10 which may be somewhat longer than usual to accommodate the present novel coloring means extends from the fining section of a glass melting furnace tank 11 and is provided at its outer end or nose portion with a discharge orifice 13 controlled by a conventional plunger 14. The molten glass, designated 15 in FIG. 3, issuing from the fining section of tank 11 is clear or flint glass and the glass discharged at orifice 13 is green.

To effect this coloration the following refractory elements made of fired chromic oxide refractory material are provided. Referring to FIG. 1, a series of four skimmers designated, successively, 17, 18, 19 and 20, are provided. These skimmers may have laterally projecting portions at their upper corners for resting upon the opposed side walls of the forehearth, in a manner generally familiar to those versed in the glass furnace construction art.

In FIG. 1 the numerals 21 and 22 denote a pair of rotary paddles which extend downwardly through the cover 23 of forehearth 10 and may be supported and rotated in a manner well known in the glass melting art. In place of individual paddles between the successive skimmers 18, 19 and 20, several laterally spaced paddles may be provided between each pair of skimmers.

The novel and important feature of the structure of FIG. 1 is that the skimmers 17 through 20 and the paddles or stirrers 21 and 22, or at least the portions thereof which extend into the molten glass, are of a refractory material composed principally of $Cr_2O_3$. As a specific example, Corning Glass Company sells commercially a fired chromic oxide refractory under No. C-1215 which consists substantially of 96.0% of $Cr_2O_3$ and 4.0% of $TiO_2$.

The flow of the molten glass beneath the skimmers 17 through 20 and the agitation thereof by paddles or stirrers 21 and 22 causes the material of the skimmers and stirrers to erode into the molten glass and since these members consist almost entirely of $Cr_2O_3$ substantial green coloration of the glass is achieved.

The degree of erosion of chromic oxide refractory material into the glass and the consequent degree of green coloration imparted thereto may be varied and controlled by the number of skimmers which are provided, the depth to which the skimmers extend into the glass, and the number and size of the stirring paddles and the rate of rotation thereof. While the paddles illustrated are flat spatula-type stirrers the paddle portions thereof may be helically formed to effect a lifting action on the glass whereby the molten glass is caused to flow in an undulating path, beneath successive skimmers and upwardly between skimmers, as a result of the lifting action of the helical paddles.

In the embodiment of FIGS. 2 and 3, the molten glass is caused to pursue a tortuous path through the portion of the forehearth wherein coloration is effected by interposing baffle walls. In FIGS. 2 and 3 the forehearth is designated 30, the melting tank proper is designated 31, and the discharge orifice 32. A chromic oxide refractory skimmer 33 is provided and, following the same, a series of baffle walls 34 through 38 of chromic oxide refractory which rest upon the bottom of forehearth and extend alternately from the opposite side walls of the forehearth as clearly shown in FIG. 3.

Paddles or stirrers of chromic oxide refractory are disposed between certain of the adjacent baffle walls as at 40, 41 and 42 in FIG. 3. Conventional means for rotating the paddles may be employed and here again the degree of coloration may be controlled by the number of baffle walls, the degree to which they constrict the flow of molten glass, and the number, size, configuration and speed of rotation of the paddles. Various combinations of the chromic oxide elements of the two embodiments may be employed.

I claim:

1. A method of producing green glass from a body of molten clear glass in a melting furnace which comprises melting batch ingredients to produce clear glass and fining the same, then conducting said clear fined molten glass to and along a forehearth leading from said furnace, and interposing chromic oxide refractory bodies consisting mainly of $Cr_2O_3$ in the path of flow of said molten glass in said forehearth to deflect the same to cause and promote erosive action of said glass against said chromic oxide refractory means and thus add chromic oxide to said molten glass in an amount equal to at least 0.015% of the glass passing through the forehearth to color the same green.

References Cited

UNITED STATES PATENTS

| 2,498,622 | 2/1950 | Mochel | 106—59 |
| 3,228,778 | 1/1966 | Walther | 106—57 |
| 3,279,776 | 10/1966 | Loffler | 263—46 |

S. LEON BASHORE, Primary Examiner

J. H. HARMAN, Assistant Examiner

U.S. Cl. X.R.

65—17, 30, 61, 146, 345, 374, 375; 106—59